Oct. 5, 1965 T. R. GONDERT ETAL 3,209,849
CLEARANCE MODULATED FRICTIONLESS ATTRACTION DEVICE FOR
INCREASING THE TRACTIVE ENGAGEMENT BETWEEN VEHICLES
AND THE SUPPORTING SURFACE
Filed March 11, 1963 3 Sheets-Sheet 3

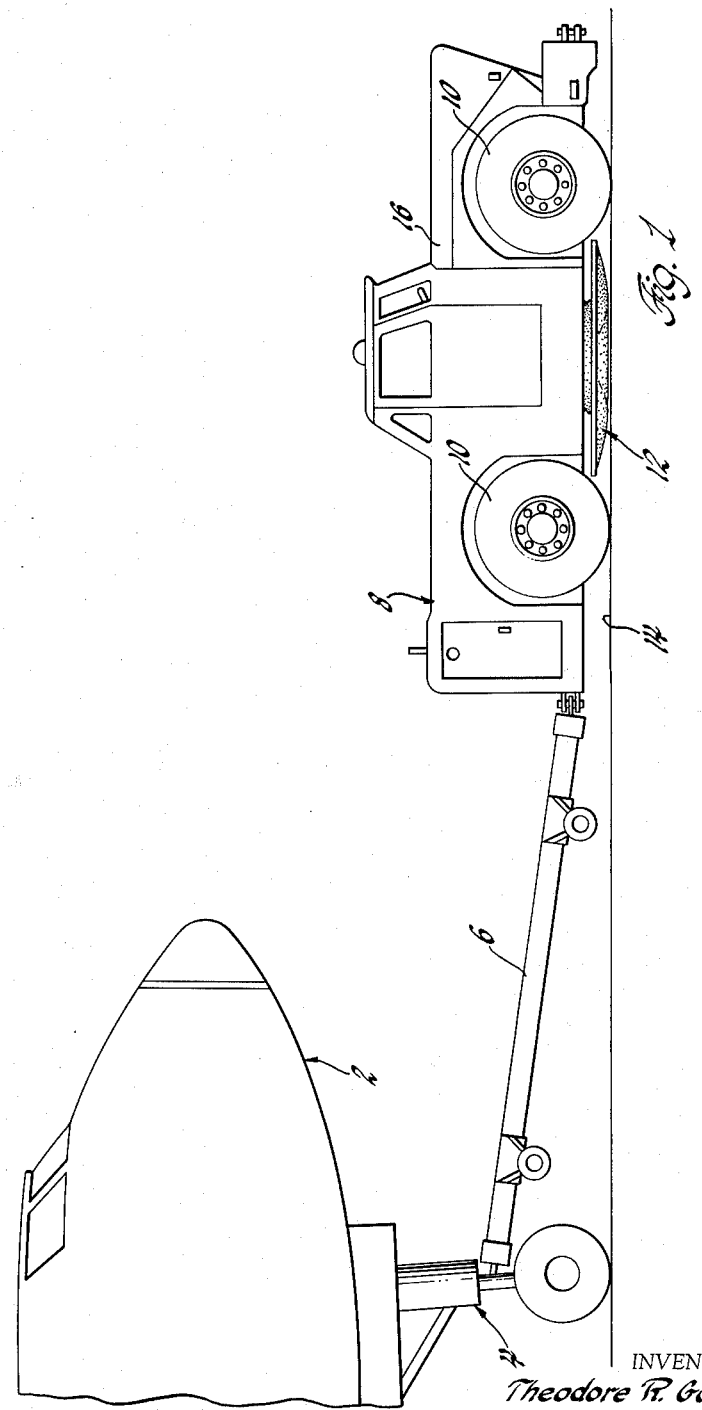

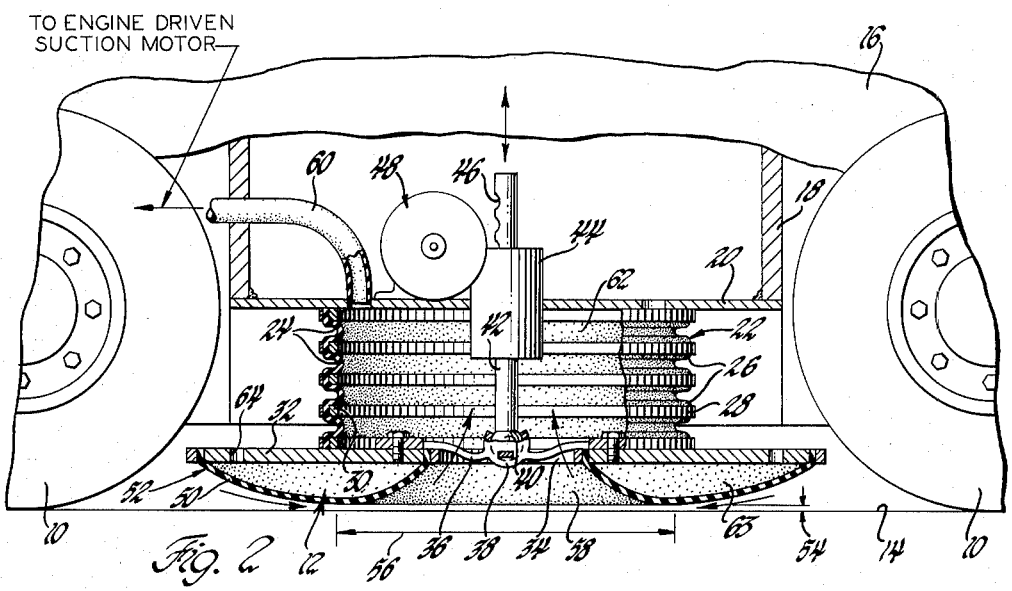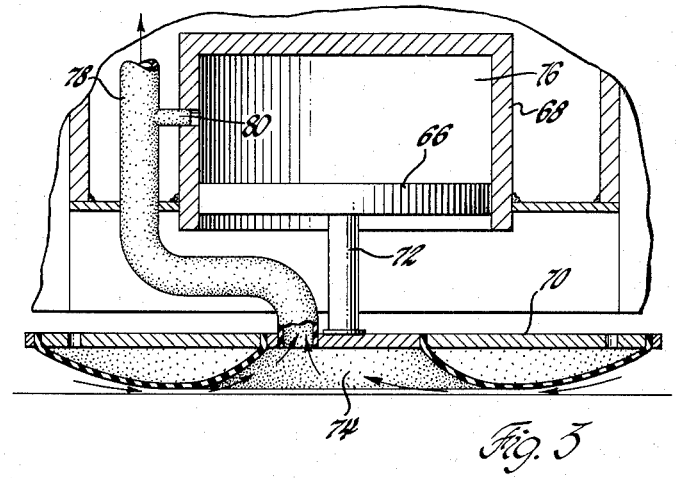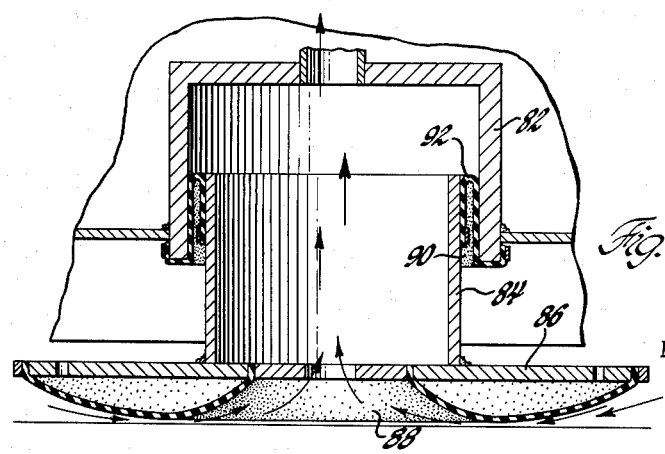

INVENTOR.
Theodore R. Gondert
BY David R. Snoeyenbos
W. F. Wagner
ATTORNEY

United States Patent Office 3,209,849
Patented Oct. 5, 1965

3,209,849
CLEARANCE MODULATED FRICTIONLESS ATTRACTION DEVICE FOR INCREASING THE TRACTIVE ENGAGEMENT BETWEEN VEHICLES AND THE SUPPORTING SURFACE
Theodore R. Gondert, Romeo, and David R. Snoeyenbos, Troy, Mich., assignors to General Motors Corporation, Detroit, Mich., a corporation of Delaware
Filed Mar. 11, 1963, Ser. No. 264,393
18 Claims. (Cl. 180—7)

This invention relates to mobile devices for providing an attraction force relative to a traversable surface, and more particularly to subambient pressure energized devices capable of producing an attraction force while maintaining frictionless relation with the transversable surface.

The present invention is an improvement on the device disclosed in copending application Serial No. 161,-048, Harry A. Mackie, entitled Pendant Air Bearing Load Supporting Device, filed Dec. 21, 1961, and assigned to General Motors Corporation, now Patent No. 3,167,145. The indicated application disclosed a device capable of producing an attraction force by means of pressure differential induced at opposite sides of a bearing comprising a rigid annulus and a flexible annulus peripherally sealed together. When operating in an atmospheric environment, subatmospheric pressure is induced in the space between the flexible annulus and an adjacent supporting surface which subatmospheric pressure operates to attract the bearing into proximate relation with the surface. The space between the flexible annulus and the rigid annulus is vented to atmosphere to enable the flexible annulus to distend toward the supporting surface to form a plenum cavity, the effective attraction force area being defined by the area contained within a perimeter bounded by the outermost distention of the flexible annulus. While a device of the type described operates effectively if a load is imposed thereon in opposition to the attracting force, such load must be balanced relative to the generated pressure and effective support or attraction force area, otherwise, there is a tendency to create a "suction cup" effect which causes the device to be drawn into frictional contact with the supporting device. Naturally, the suction cup effect may also be prevented by mounting the bearing structure on a wheeled or wheelless support which engages the supporting surface so as to maintain a fixed clearance between the rigid annulus and the supporting surface. However, allowable variation in generated pressure without suction cup effect is quite limited and the ability of the bearing to negotiate undulating surfaces is extremely limited.

According to the general features of the present invention, a subatmospheric pressure energized air bearing of the general type shown in the above-mentioned application is arranged in series relationship with a subatmospheric pressure energized air spring in a manner whereby pressure within and the effective area of both are equal. Thereby, when increase in proximity of the air bearing to the supporting surface occurs, the resulting increase in subatmospheric pressure therebetween is counteracted by a corresponding increase in subatmospheric pressure within the air spring, with the result that a repulsing force is exerted by the air spring sufficient to prevent the air bearing from being attracted into frictional contact with the supporting surface. Conversely, when decrease in proximity of the air bearing to the supporting surface occurs, the resulting decrease in subatmospheric pressure therebetween is counteracted by a like decrease in pressure in the air spring which reduces the repulsing force exerted by the air spring sufficient to prevent the air bearing from being pulled away from the supporting surface until the gap between the flexible annulus and the supporting surface is so great as to destroy the operating efficiency of the bearing. As used herein, the expression "increase in subatmospheric pressure" is intended to mean a condition wherein the pressure progresses toward a vacuum, while the expression "decrease in subatmospheric" denotes a pressure progressively approaching atmospheric. The expression "negative air bearing" and "negative air springs" are to be considered synonymous with the terms "subatmospheric pressure energized air bearing" and "subatmospheric pressure energized air spring." Further, in all cases a "negative air bearing," as used herein, refers exclusively to a device operating in proximate relation to but not in contact with a supporting surface.

An object of the invention is to provide an improved frictionless attraction device.

Another object is to provide a frictionless attraction device including self-regulating means for maintaining the device within a predetermined clearance range relative to a surface.

A further object is to provide a device of the stated character adapted to provide simulated loading for a ground engaging vehicle.

A still further object is to provide a device of the stated character capable of developing simulated gravity force in a gravity free environment.

Still a further object is to provide a subambient pressure energized device comprising a series arranged fluid bearing and fluid spring.

Yet a further object is to provide a device of the stated character wherein the fluid spring pressure varies directly with the fluid bearing pressure.

These and other objects, advantages and features of the invention will become more fully apparent as reference is had to the accompanying specification and drawings wherein:

FIGURE 1 illustrates an application of the invention in connection with a tow vehicle for moving heavy aircraft;

FIGURE 2 is a greatly enlarged fragmentary side elevational view of a portion of the vehicle shown in FIGURE 1, illustrating details of construction of the invention;

FIGURE 3 is a fragmentary sectional elevational view of a modified form of the invention;

FIGURE 4 is a fragmentary side elevational view of another modified form of the invention;

Figure 5:
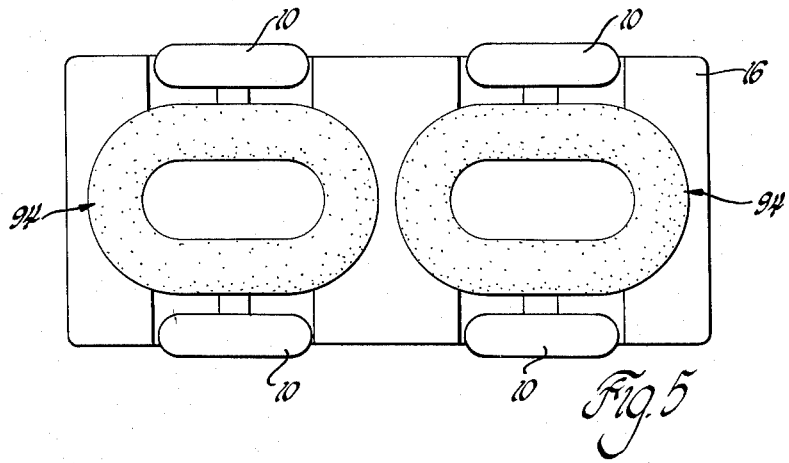
FIGURE 5 is a schematic view of a further modification of the invention.

Referring now to the drawings and particularly FIGURE 1, reference numeral 2 generally designates a conventional commercial aircraft of the type normally provided with laterally spaced apart main landing wheels, not shown, and a forwardly disposed nose wheel structure 4. In moving such aircraft around parking and loading areas, it is the conventional practice to utilize a tow bar 6 and an aircraft tow vehicle generally similar in configuration to the vehicle identified as 8. Heretofore, such tow vehicles have been characterized by extraordinary weight in relation to the size of the vehicle. At the present time, vehicles with gross weight in excess of 40,000 pounds are fairly common. The sole purpose of the extraordinary weight is to provide sufficient loading on the ground engaging wheels 10 so that slippage will not occur when the vehicle is operated in towing extremely heavy aircraft. Obviously, such great weight renders the tow vehicle useful only for the most specialized purpose, and in turn necessitates extremely high unit cost.

The present invention completely obviates the previous necessity for extraordinary weight in such vehicles while providing equal or greater tractive effort, when needed.

In accordance with the present invention, the vehicle 8 is fabricated with minimum deadweight and is provided with a clearance modulated frictionless attraction device 12 which is brought into operation relative to the ground 14 only when the vehicle is actually engaged in towing an aircraft. In the illustrated embodiment, device 12 is suspended beneath the vehicle superstructure 16 within the space bounded by the four driving wheels of the vehicle, preferably in vertical alignment with the natural center of gravity thereof.

As seen best in FIGURE 2, the central superstructure of the vehicle is provided with a box structure 18 having a lower wall portion 20 to which is attached the upper end of the bellows-type subatmospheric pressure energized air spring 22. Spring 22 is formed with radially inwardly extending unrestrained convolutions 24 and radially outwardly extending convolutions 26 which are rendered rigid by encircling stiffening rings 28 and 30. The lower end of spring 22 in turn is secured to the upper surface of a rigid annular platform 32. The central opening 34 in platform 32 is bridged by a spider 36 having a central spherical socket portion 38 which embraces the ball end 40 of a vertically slidable pillar 42. Pillar 42 extends upwardly through a sleeve member 44 rigidly secured in wall 20 and is normally freely vertically slidable therein. The upper end of pillar 42 is formed with vertically spaced teeth 46 which are engageable by a motor driven clutchable drive assembly 48 adapted to mechanically elevate and retain the platform 32 under certain conditions to be described hereinafter.

Disposed below platform 32 is a flexible diaphragm 50 having its outer periphery secured in sealing engagement adjacent the outer periphery of platform 32 and its inner periphery secured in sealing engagement adjacent the opening 34 in platform 32 to form a negative air bearing assembly 52. Diaphragm 50 is preferably formed so as to provide a single depending annular convolution, the lowermost extremity of which cooperates with the ground surface 14 to define a throttling gap 54. In the illustrated embodiment, the platform and diaphragm are taken to be circular in plan form and the throttling gap 54 therefor establishes the ground level circular boundary 56 of a plenum cavity 58, the area of which corresponds to the effective area of air spring 22. The interior of spring 22 and the plenum cavity 58 are subjected to subatmospheric air pressure by means of a conduit 60 which extends through the lower wall 20 of box structure 18 and connects with an engine driven vacuum pump or suction motor, not shown.

Operation of the device is as follows. After the vehicle 8 has been connected to the aircraft 2 by the tow bar 6, the engine driven vacuum pump is engaged. Negative pressure or partial vacuum thereby produced evacuates air from the interior 62 of spring 22 and from the plenum cavity space 58. Simultaneously the annular cavity 63 formed between the diaphragm 50 and platform 32 is subjected to atmospheric pressure through vent 64 thereby causing the diaphragm to bulge into the configuration shown and establish the throttling gap 54. Thereafter the engine driven vacuum pump need only maintain a predetermined constant rate of withdrawal of air from plenum 58 and the interior 62 of spring 22 in relation to the rate of entrance of atmospheric air into plenum 58 through the throttling gap 54 in order to establish a given negative pressure within the area bounded by the circle 56. Assuming, for example, maintenance of a constant one-half atmosphere pressure condition in plenum cavity 58 and bellows interior 62, it will be evident that the pressure differential existing at opposite sides of platform 32 will produce a hold-down or attraction force relative to the vehicle which is equal to the pressure differential times the effective area within circle 56. By simple computation it will be seen that a simulated load or attraction force equivalent to a typical tow vehicle dead weight may be derived by an attraction device having approximately 5,000 square inches of effective area, which area is considerably less than the actual plan form area between the four wheels of a typical tow vehicle. As previously mentioned, simultaneous with the production of subatmospheric condition within plenum cavity 58, there is produced a corresponding subatmospheric pressure within bellows 22. In accordance with the invention, the subatmospheric pressure within bellows 22 functions to modulate the level of platform 32 so as to maintain the throttling gap 54 within a minimum and maximum clearance range irrespective of the level of subatmospheric pressure generated by the vacuum pump or of variations or undulations in the ground surface 14. With respect to the latter, if surface conditions exist which would permit variation in ground level between the forward and rearward wheels of the vehicle and tend to cause reduction in the throttling gap, the rate of inflow of atmospheric air into plenum 58 through the throttling gap would be reduced and the subatmospheric condition within plenum 58 would necessarily rise. While progressive rise in subatmospheric pressure within plenum 58 would ordinarily cause the lowermost extremity of the diaphragm to bottom out and produce a suction cup effect, in the present invention this effect is prevented by the fact that a corresponding rise in subatmospheric pressure occurs simultaneously within air spring 22 causing the latter to contract toward wall 20 and elevate the platform 32 sufficiently to restore throttling gap 54. Naturally, the reverse condition, that is, increase in the throttling gap 54, allows more rapid entrance of atmospheric air into plenum 58. However, the pressure within spring 22 again corresponds to the decrease within plenum 58 and allows the platform 32 to descend sufficient to restore the gap 54.

Stabilization of the complete device 12 relative to forward motion of the vehicle and universal inclinability of the negative air bearing 52 relative to the vehicle is provided by the ball and socket connection with pillar 42, previously mentioned. After the tow vehicle has completed its assignment, the engine driven vacuum pump is deenergized and the negative air bearing 52 is elevated by the clutchable drive assembly 48 to a level placing the platform 32 and diaphragm 50 well above the level of ground 14. The wheels of the vehicle are thereafter subjected only to the actual gross weight of the vehicle during movement to and from a towing site.

FIGURE 3 illustrates a modification of the invention wherein the negative air spring is in the form of a piston 66 and cylinder 68, the piston being connected to the platform 70 by a piston rod 72 and series fluid communication between the plenum 74 and the interior 76 of the spring being provided by a flexible main conduit 78 and branch conduit 80.

FIGURE 4 illustrates another modification wherein the negative air spring is in the form of a cylinder 82 and a hollow piston 84 connected to platform 86 and communicating with plenum 88, the annular space 90 between the piston and cylinder being closed by a rolling diaphragm 92.

FIGURE 5 schematically illustrates another form of the invention wherein a pair of generally rectangular longitudinally aligned attraction devices 94 similar to device 12 are disposed beneath the vehicle between the wheels 10, thereby permitting greatly increased hold-down potential while remaining entirely within the plan form of the vehicle.

Figure 6:
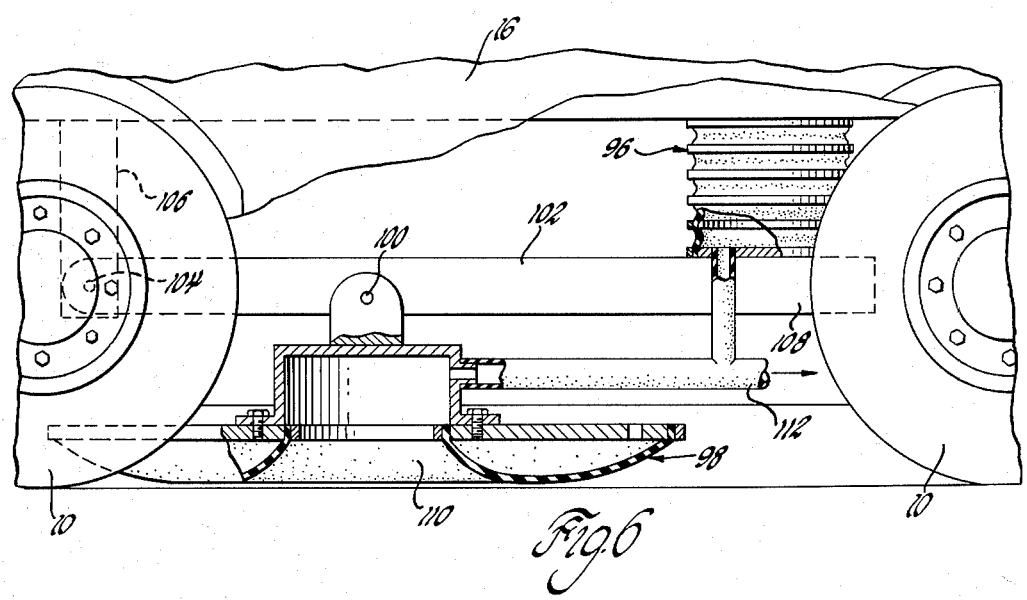
FIGURE 6 is a schematic view of a further modification of the invention.

FIGURE 6 schematically illustrates a further modification of the invention wherein a negative air spring 96 in the form of a bellows is utilized in conjunction with a negative air bearing 98 having significantly greater effective area than the bellows. The upper end of negative air bearing 98 is pivotally connected at 100 to a horizontal bear 102, one end of which is pivotally connected at 104 to the vehicle superstructure 106. Beam 102 extends beyond pivotal connection 100 for engagement at its free end 108 with the lower end of bellows 96. The distance between pivot 104 and 100 and between 100 and the center of bellows 96 are calculated to provide a lever ratio which is inversely proportional to the ratio of effective areas of negative air bearing 98 and air springs 96. Therefore, the effective opposing forces produced by subatmospheric pressure induced in plenum 110 and the interior of spring 96 via conduit 112 are brought into unity ratio by the mechanical advantage afforded by beam 102.

From the foregoing it will be seen that a novel and extremely useful device has been provided. The invention not only enables simulation of great weight for wheeled vehicles requiring high tractive effort but in addition has equal or greater utility in applications involving surfaces other than ground surfaces. For example, as may be readily visualized by considering the vehicle in an upside-down condition, the device operates equally well in juxtaposition with an overhead surface where the attraction force may be utilized to frictionlessly support suspended loads. Similarly, the device is equally effective in a gravity free environment wherein it may be utilized to produce a force simulating gravity. It is also to be noted that the device enables operation of conventional vehicles over extremely steep road inclinations where traction would normally be lost.

While several embodiments of the invention have been shown and described, it will be apparent that other changes and modifications may be made therein. It is, therefore, to be understood that it is not intended to limit the invention to the embodiments shown, but only by the scope of the claims which follow.

We claim:

1. A device for providing frictionless attraction force relative to a surface comprising, a surface proximate subambient pressure energized fluid bearing and a subambient pressure energized fluid spring connected in mechanical and fluid series relation.

2. In combination with a surface engageable member, a device for providing frictionless attraction force urging said member into engagement with said surface comprising, a surface proximate subambient pressure energized fluid bearing and a subambient pressure energized fluid spring disposed between said member and surface, means providing mechanical series relation between said spring and bearing, and means providing fluid series relation between said spring and bearing.

3. The structure set forth in claim 2 wherein the effective areas of said fluid bearing and fluid springs are in unity ratio.

4. In a device of the class described, a surface proximate subambient pressure energized fluid bearing and a subambient pressure energized fluid spring, means providing mechanical series relation between said spring and bearing, means providing fluid series relation between said spring and bearing, the effective area of said fluid bearing and fluid spring being in differential ratio, and means associated with said means providing mechanical series relation operative to provide a mechanical ratio inversely proportional to said differential ratio.

5. A frictionless hold-down device comprising, a surface proximate subambient pressure energized fluid bearing and a subambient pressure energized fluid spring connected in axial juxtaposed relation, and means providing series fluid communication between said bearing and said spring.

6. A frictionless load simulating device for increasing the effective traction of a vehicle relative to the ground comprising, a subatmospheric pressure energized fluid spring device connected at one end on the vehicle, a subatmsopheric pressure energized fluid bearing device connected at the other end of said fluid spring adapted to be disposed in proximate relation to the ground, means for introducing subatmospheric pressure directly into one of said devices, and means providing series communication between said devices.

7. A self-modulating attraction device comprising, a negative air bearing device disposed in proximate relation to a surface, a negative air spring device connected at one end to said air bearing and at the other end to an attraction responsive member, a source of negative air pressure, means providing direct communication between said source and one of said devices, and means providing substantially unrestricted fluid communication between said devices.

8. A self-modulating attraction device comprising, a negative air bearing device disposed in proximate relation to a surface, a negative air spring device connected at one end to said air bearing and at the other end to an attraction responsive member, a source of negative air pressure, and means connecting said devices in fluid communication with said source in a manner effective to maintain a constant pressure ratio within the respective devices.

9. The structure set forth in claim 8 wherein the effective areas of said spring and bearings are in unity ratio.

10. A frictionless load simulating device for increasing effective frictional engagement between a surface engaging member and a surface comprising, a subatmospheric pressure energized fluid spring device supported at one end on a portion of said member, a subatmospheric pressure energized fluid bearing device connected to the other end of said fluid spring adapted to be disposed in proximate relation to the ground, means for introducing subatmospheric pressure directly into one of said devices, means providing unrestricted series communication between said devices, and means mounted on said member and engaging said bearing device effective to stabilize said bearing laterally and longitudinally of said member.

11. A frictionless load simulating device for increasing effective frictional engagement between a surface engaging member and a surface comprising, a subatmospheric pressure energized fluid spring device supported at one end on a portion of said member, a subatmospheric pressure energized fluid bearing device connected to the other end of said fluid spring adapted to be disposed in proximate relation to the ground, means for introducing subatmospheric pressure directly into one of said devices, means providing unrestricted series fluid communication between said devices, and means mounted on said member and engaging said bearing device effective to stabilize said bearing laterally and longitudinally of said member, said last mentioned means including means enabling universal angular inclination of said bearing relative to said member.

12. A frictionless load simulating device for increasing effective frictional engagement between a surface engaging member and a surface comprising, a subatmospheric pressure energized fluid spring device supported at one end on a portion of said member, a subatmospheric pressure energized fluid bearing device connected to the other end of said fluid spring adapted to be disposed in proximate relation to the ground, means for introducing subatmospheric pressure directly into one of said devices, means providing unrestricted series communication between said devices, and rectilinearly movable means interconnecting said member and said bearing operable to stabilize the latter laterally and longitudinally relative to said member while permitting both angular inclination and parallel displacement relative to said surface.

13. In combination with a member to be supported relative to a surface, a fluid spring connected at one end to said member and extending toward said surface, a rigid platform disposed in a plane parallel to said surface and connected to the other end of said spring, a flexible diaphragm connected centrally and peripherally to the lower surface of said platform shaped to provide a perimetrical depending convolution defining a central plenum cavity between the diaphragm and the ground and an annular cavity between the diaphragm and the platform, means venting said annular cavity to ambient fluid pressure, means providing direct communication between said plenum cavity and the interior of said spring, and means connected with said spring interior and said plenum cavity operable to produce continuous subambient pressure therein.

14. In combination with a wheeled member to be supported relative to a surface, a fluid spring connected at one end to said member and extending toward said surface, a rigid platform disposed in a plane parallel to said surface and connected to the other end of said spring, a flexible diaphragm connected centrally and peripherally to the lower surface of said platform shaped to provide a perimetrical depending convolution defining a central plenum cavity between the diaphragm and the ground and an annular cavity between the diaphragm and the platform, means venting said annular cavity to ambient fluid pressure, means forming an opening in said platform providing direct communication between said plenum cavity and the interior of said spring, means connected in fluid communication with said spring interior and said plenum cavity operable to produce continuous subambient pressure therein, and means telescopingly engaging said wheeled member for movement in a plane perpendicular to said surface for stabilizing said spring and platform laterally and longitudinally relative to said wheeled member.

15. The structure set forth in claim 14 wherein said fluid spring comprises a substantially radially rigid axially extensible multiple convolution bellows.

16. The structure set forth in claim 14 wherein said fluid spring comprises a piston and cylinder.

17. The structure set forth in claim 16 wherein said piston is smaller in diameter than said cylinder and the annular gap formed therebetween is closed by a rolling lobe diaphragm.

18. In combination with a member to be supported relative to a surface, a fluid spring connected at one end to said member and extending toward said surface, a beam engaging said spring at one end and pivotally connected to said member at the other end, a rigid platform disposed in a plane parallel to said surface and pivotally connected to said beam intermediate the opposite ends of said beam, a flexible diaphragm connected centrally and peripherally to the lower surface of said platform shaped to provide a perimetrical depending convolution defining a central plenum cavity between the diaphragm and the ground and an annular cavity between the diaphragm and the platform, means venting said annular cavity to ambient fluid pressure, means providing direct communication between said plenum cavity and the interior of said spring, and means including the direct communicating means connected in fluid communication with said spring interior and said plenum cavity operable to produce continuous subambient pressure therein.

References Cited by the Examiner
UNITED STATES PATENTS

| | | | |
|---|---|---|---|
| 1,698,482 | 1/29 | Nicin | 180—7 |
| 2,557,260 | 6/51 | Clark | 294—64 |
| 2,822,933 | 2/58 | Pagdin | 214—8.5 |
| 3,121,401 | 2/64 | Fields | 180—8 |

A. HARRY LEVY, *Primary Examiner.*

PHILIP ARNOLD, *Examiner.*

UNITED STATES PATENT OFFICE

CERTIFICATE OF CORRECTION

Patent No. 3,209,849                          October 5, 1965

Theodore R. Gondert et al.

It is hereby certified that error appears in the above numbered patent requiring correction and that the said Letters Patent should read as corrected below.

Column 1, line 15, for "transversable" read -- traversable --; line 22, for "disclosed" read -- discloses --; column 2, line 9, for "expression" read -- expressions --; column 5, line 4, for "bear" read -- beam --; lines 11 and 54, for "springs", each occurrence, read -- spring --; column 6, line 26, for "bearings" read -- bearing --; column 8, line 34, for "180-8" read -- 104-134 --.

Signed and sealed this 10th day of May 1966.

(SEAL)
Attest:

ERNEST W. SWIDER                                   EDWARD J. BRENNER
Attesting Officer                                       Commissioner of Patents